(12) United States Patent
Siebecke et al.

(10) Patent No.: US 9,943,824 B2
(45) Date of Patent: Apr. 17, 2018

(54) POLYMERISATION DEVICE AND METHOD FOR THE PRODUCTION OF THERMOPLASTIC POLYMERS

(71) Applicant: UHDE INVENTA-FISCHER GMBH, Berlin (DE)

(72) Inventors: Ekkehard Siebecke, Berlin (DE); Mirko Bär, Birkenwerder (DE); Bernd Königsmann, Langewahl (DE)

(73) Assignee: UHDE INVENTA-FISHER GmbH, Berlin (DE)

( * ) Notice: Subject to any disclaimer, the term of this patent is extended or adjusted under 35 U.S.C. 154(b) by 166 days.

(21) Appl. No.: 14/767,812

(22) PCT Filed: Feb. 24, 2014

(86) PCT No.: PCT/EP2014/053561
§ 371 (c)(1),
(2) Date: Aug. 13, 2015

(87) PCT Pub. No.: WO2014/131736
PCT Pub. Date: Sep. 4, 2014

(65) Prior Publication Data
US 2016/0001254 A1    Jan. 7, 2016

(30) Foreign Application Priority Data
Feb. 27, 2013 (EP) ..................... 13157020

(51) Int. Cl.
*B01J 19/24* (2006.01)
*C08G 69/16* (2006.01)
(Continued)

(52) U.S. Cl.
CPC ............... *B01J 19/24* (2013.01); *B01J 4/002* (2013.01); *B01J 19/0013* (2013.01);
(Continued)

(58) Field of Classification Search
CPC ................................................. B01J 2219/0094
See application file for complete search history.

(56) References Cited

U.S. PATENT DOCUMENTS 5,973,105 A    10/1999    Wiltzer et al.
6,235,852 B1    5/2001    Hess et al.
(Continued)

FOREIGN PATENT DOCUMENTS

DE    195 06 407 A1    8/1996
WO    WO 1997/008223 A1    3/1997
(Continued)

OTHER PUBLICATIONS

European Patent Office, International Search Report in International Application No. PCT/EP2014/053561 (dated May 7, 2014).
(Continued)

*Primary Examiner* — Rachel Kahn
(74) *Attorney, Agent, or Firm* — Leydig, Voit & Mayer, Ltd.

(57) ABSTRACT

The present invention relates to a polymerization device for the production of melts of thermoplastic polymers in which the heat of the discharged product can be recovered and used for preheating of the usable raw materials. In addition, the present invention relates to a corresponding method for the production of thermoplastic polymers.

23 Claims, 1 Drawing Sheet

(51) Int. Cl.
*B01J 19/00* (2006.01)
*B01J 4/00* (2006.01)

(52) U.S. Cl.
CPC .......... *B01J 19/2445* (2013.01); *C08G 69/16* (2013.01); *B01J 2219/0006* (2013.01); *B01J 2219/00058* (2013.01); *B01J 2219/00083* (2013.01); *B01J 2219/00087* (2013.01); *B01J 2219/00204* (2013.01); *B01J 2219/00238* (2013.01); *B01J 2219/24* (2013.01)

(56) References Cited

U.S. PATENT DOCUMENTS

| | | |
|---|---|---|
| 6,258,926 B1 | 7/2001 | Wiltzer et al. |
| 2006/0270882 A1* | 11/2006 | Brown .................. B01J 8/067 585/502 |

FOREIGN PATENT DOCUMENTS

| WO | WO 1998/029185 A1 | 7/1998 |
|---|---|---|
| WO | WO 2006/001113 A1 | 1/2006 |
| WO | WO 2013/073595 A1 | 5/2013 |

OTHER PUBLICATIONS

European Patent Office, Written Opinion in International Application No. PCT/EP2014/053561 (dated Aug. 27, 2015).

Saudi Patent Office, Substantial Examination Report in Saudi Arabian Patent Application No. 515360929 (dated Jun. 28, 2016).

International Bureau of WIPO, International Preliminary Report on Patentability in International Application No. PCT/EP2014/053561 (dated Sep. 11, 2015).

Intellectual Property Office, Ministry of Economic Affairs, R.O.C., Notice of Examination in Taiwanese Patent Application No. 103106388 (dated Jun. 21, 2017).

* cited by examiner

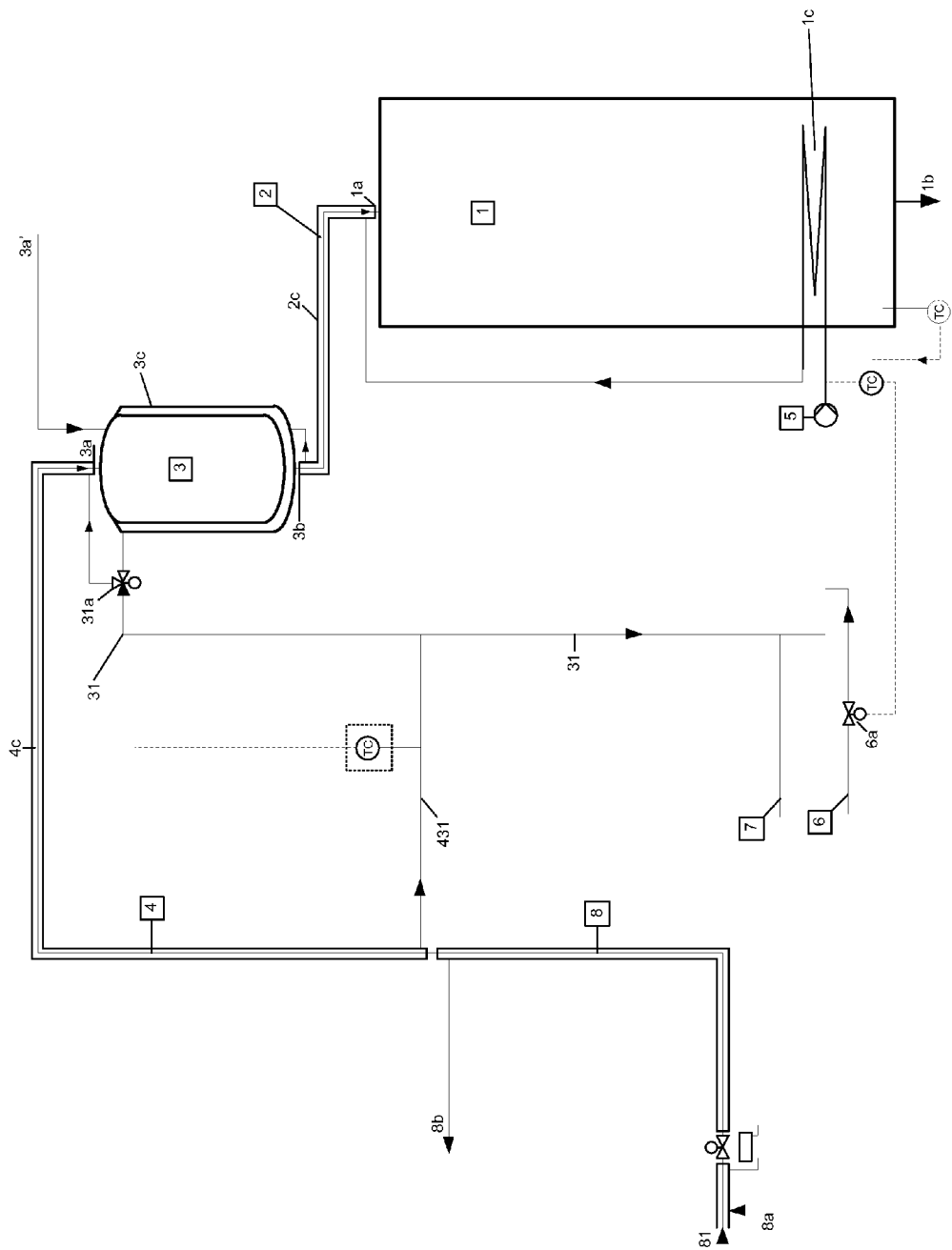

POLYMERISATION DEVICE AND METHOD FOR THE PRODUCTION OF THERMOPLASTIC POLYMERS

CROSS-REFERENCE TO RELATED APPLICATIONS

This patent application is the U.S. national phase of International Application No. PCT/EP2014/053561, filed on Feb. 24, 2014, which claims the benefit of European Patent Application No. 13157020.2, filed Feb. 27, 2013, the disclosures of which are incorporated herein by reference in their entireties for all purposes.

The present invention relates to a polymerisation device for the production of melts of thermoplastic polymers in which the heat of the discharged product can be recovered and used for preheating of the usable raw materials. In addition, the present invention relates to a corresponding method for the production of thermoplastic polymers.

It is known from the state of the art to undertake the cooling of polymer melts in order to effect a rise in the relative viscosity. For this purpose, heat from the polymer melt is withdrawn by means of an air cooler and discharged to the environment. The waste heat is hence lost without being used.

The object is the development of a constructive solution for returning quantities of heat from the melt cooler of the polymerisation reactor to the polymerisation process. A separate heat exchanger is thereby intended to be avoided but the temperature is intended to be permanently and reliably below the inflow temperature of the heat transfer oil to the melt cooler in the polymerisation reactor.

This object is achieved, with respect to a polymerisation device, by the features of patent claim 1, with respect to a method for the production of thermoplastic polymers, by the features of patent claim 17. The respective dependent patent claims thereby represent advantageous developments.

According to the invention, a polymerisation device is hence indicated which comprises
  a) at least one polymerisation reactor (1) of a one- or multistep configuration,
  b) at least one mixing container (3), connected in front of the at least one polymerisation reactor (1), and also
  c) at least one pipeline (2) which connects an outlet (3b) of the at least one mixing container (3) to an inlet (1a) of the at least one polymerisation reactor,
the at least one polymerisation reactor (1), the at least one mixing container (3) and the at least one pipeline (2) respectively comprising at least one heat exchanger element (1c, 2c, 3c), the at least one heat exchanger element (1c) of the at least one polymerisation reactor, the at least heat exchanger element (2c) of the pipeline (2) and the at least one heat exchanger element (3c) of the mixing container (3) being able to be flowed through by a heat exchanger fluid and being connected in series.

It is hence provided with the polymerisation device according to the invention that each of the essential components, i.e. the polymerisation reactor, the mixing container and also the pipeline which connects the mixing container to the polymerisation reactor comprises a heat exchanger element. The individual heat exchanger elements are thereby connected in series and can be able to be flowed through by a heat exchanger fluid. In particular, the heat exchanger fluid thereby flows through the individual heat exchanger elements in the direction starting from the polymerisation reactor via the pipeline to the heat exchanger element of the mixing container.

With this cascade of heat exchanger elements, recovery of the thermal energy of the polymer melt occurring as product in the polymerisation reactor is possible. By means of the heat exchanger fluid, thermal energy can be withdrawn from the polymer melt occurring in the polymerisation reactor and can be transferred to the substances to be supplied to the polymerisation reactor.

In the mixing container, for example presentation of the monomers or oligomers from which the thermoplastic polymer reactor is intended to be produced in the polymerisation can be effected. In the mixing container, further substances, such as for example additives, catalysts etc., can be added to the monomers or oligomers at the same time.

These educts are supplied via the pipeline to the polymerisation reactor. By recovering the thermal energy which is contained in the melted polymeric materials, partial heating of the educt materials can even be effected hence via the heat exchanger fluid on the route to the polymerisation reactor.

The advantage resides in the saving in costs and installation space in comparison with solutions which have separate heat exchangers. The heat from the polymerisation reactor is supplied completely again to the process, no additional equipment is required, the pipeline for virgin caprolactam is provided, as is standard, with a double-jacket which is also suitable for heating with heat transfer oil. The tendency towards pollution of this invention is less than with most normal types of heat exchanger. The efficiency of the heating in the double-pipe is relatively high since high flow velocities are achieved in the inner pipe and in the jacket. The temperature of the heat transfer oil can be reliably reduced below the value required for the polymer cooling so that, with a simple feed/bleed control, the required temperature of the heat transfer oil can be adjusted.

The heat exchanger elements which are configured in the above-mentioned essential components of the polymerisation device can thereby be formed in any way. In particular, heat exchanger elements known for example from the state of the art are used.

According to preferred embodiments of the invention, it is provided that the heat exchanger element (2c) of the pipeline (2) is produced by a double-walled pipe construction (pipe with double-jacket) of the pipeline (2).

In particular, it is advantageous if the mixing container (3) has a jacket which represents the heat exchanger element (3c).

In addition, the heat exchanger fluid can be guided in a closed circulation. It is provided for example for this purpose that the heat exchanger element (3c) of the mixing container (3) is connected via a pipeline (31) to the heat exchanger element (1c) of the polymerisation reactor (1).

Furthermore, it is possible that even the supply of educts to the mixing container is temperature-controlled. This can be achieved for example by the mixing container (3) having at least one inlet (3a) which is provided with a pipeline (4) which has at least one heat exchanger element (4c).

Here also, it is preferred if the heat exchanger element (4c) of the pipeline, with which the educts can be supplied to the mixing container, has a double-walled construction.

It can be provided furthermore in this respect that the at least one heat exchanger element (4c) of the pipeline (4) is connected in series to the heat exchanger element (3c) of the mixing container (3), i.e. that for example the heat exchanger fluid, after passing through the mixing container, is fed into the heat exchanger element (4c) of the pipeline (4).

A further embodiment provides that the heat exchanger fluid, as described above, is guided in circulation, it being provided furthermore that the heat exchanger element (4c) of the inflow pipe (4) for the mixing container is connected to this circulation. This can be effected for example by the heat exchanger element (3c) of the mixing container (3) being connected via a three-way valve (31a) to the pipeline (31) and to the heat exchanger element (4c) of the pipeline (4). Alternatively, instead of the three-way valve, also two two-way valves or another suitable valve device can be present for control of the partial flows.

Also the back-flow of heat exchanger fluid fed into the heat exchanger element (4c) of the inflow pipe (4) for the mixing container (3) can be returned to the circulation. It can be provided for this purpose that the heat exchanger element (4c) of the pipeline (4) is connected via a pipeline (431) to the pipeline (31).

According to the above-described embodiments, two circulations for the heat exchanger fluid which can be coupled together are hence produced: a first circulation guides the heat exchanger fluid from the mixing container back to the polymerisation reactor, the second circulation guides the heat exchanger fluid via the inflow pipe for the mixing container. Both circulations can be guided together again so that both heat exchanger fluid flows—the flow fed into the return pipe to the polymerisation reactor and also the heat exchanger fluid flow guided via the inflow pipe for the mixing container—can be guided via a common strand back to the polymerisation reactor.

Via the 3-way valve, for example division of the heat exchanger fluid flows can be undertaken. This can be effected in particular with temperature control, it can be provided for this purpose that, in the connection pipe (the pipeline which guides the heat exchanger fluid from the inflow pipe to the mixing container back into the connection pipe between mixing container and polymerisation reactor), a temperature sensor is included. The temperature sensor can be configured for controlling the previously-described 3-way valve.

Furthermore, it is advantageous if the pipeline (31) comprises at least one pump (5) for conveying the heat exchanger fluid.

For temperature-control of the heat exchanger fluid guided in the circulation, it can be provided furthermore that the pipeline which connects the heat exchanger element of the mixing container to the heat exchanger element of the polymerisation reactor has at least one inflow and at least one outflow. Via the outflow, heat exchanger fluid can be removed from the pipeline, specially temperature-controlled heat exchanger fluid can be supplied via the outflow of the pipeline. The temperature and also the quantity of supplied heat exchanger fluid can be adjusted in a defined fashion so that, after the inflow, a defined temperature-controlled heat exchanger fluid flow is present and can be supplied furthermore to the heat exchanger element of the polymerisation reactor. Preferably, the outflow is thereby disposed in the throughflow direction of the pipeline, further downstream, compared with the inflow.

Furthermore, it is preferred if the pipeline (31) and/or the polymerisation device has at least one temperature sensor (TC) for determining the temperature of the heat exchanger fluid in the pipeline (31) and/or of the content of the polymerisation reactor (1).

Via the temperature sensor or sensors, for example the quantity or the temperature of the heat exchanger fluid flow supplied via the inflow can be regulated and hence ultimately the temperature of the polymer melt discharged from the polymerisation reactor can be adjusted. In this way, likewise the quantity of recovered thermal energy can be adjusted.

It is hereby advantageous in particular if the inflow (6) and/or the outflow (7) comprises a control valve (6a), via which the quantity of heat exchanger fluid supplied via the inflow (6) into the pipeline (31) and/or the quantity of heat exchanger fluid discharged via the outflow (7) from the pipeline (31) can be regulated.

In particular, the control valve (6a) is regulated by the at least one temperature sensor (TC).

The pipeline which guides educts to the mixing container can likewise be supplied via a temperature-controlled supply.

Furthermore, the invention relates to a method for the production of thermoplastic polymers by polymerisation or polycondensation, preferably of polyamides, in particular polyamide 6 or copolyamides comprising polyamide 6 units, with a polymerisation device according to one of the preceding claims, in which
  a) material to be polymerised or to be polycondensed is fed into a mixing container (3) and possibly mixed with further substances to be mixed in,
  b) the material or material mixture is supplied via the pipeline (2) to the polymerisation device (1) and is polymerised or polycondensed there to form the thermoplastic polymer,
  c) the thermoplastic polymer is cooled via the heat exchanger element (1c), the heat exchanger medium guided in the heat exchanger element (1c) being heated, and
  d) and subsequently is discharged as melt out of the polymerisation reactor (1) via the outlet (1b), the heat exchanger fluid heated in the heat exchanger element (1c) being guided through the heat exchanger element (2c) of the pipeline (2) and subsequently through the heat exchanger element (3c) of the mixing container (3), the material or material mixture guided or contained in the pipeline (2) and the mixing container (3) being temperature-controlled, in particular heated.

In particular, it is advantageous in the method according to the invention if the heat exchanger fluid in the heat exchanger element (2c) of the pipeline (2) is guided in counterflow to the flow direction of the material or of the material mixture.

The heat exchanger fluid, after passing through the heat exchanger element (3c) of the mixing container (3), can
  a) be fed into a pipeline (31) and supplied to the heat exchanger element (1c) and consequently guided in circulation, and/or
  b) be fed into the heat exchanger element (4c) of the pipeline (4) and guided in counterflow to the material guided in the pipeline (4).

Preferably, it can be provided in addition that the feeding of the heat exchanger fluid into the pipeline (31) and/or into the heat exchanger element (4c) is effected via the three-way valve (31a), control of the volume distribution of the proportion of heat exchanger fluid fed into the pipeline (31) and/or into the heat exchanger element (4c) being effected with temperature control via a temperature sensor (TC).

In particular, it is preferred in the method according to the invention if warm heat exchanger fluid is removed from the pipeline (31) via the outlet (7) and if cool heat exchanger fluid is supplied via the supply (6), the quantity of discharged or supplied heat exchanger fluid being controlled preferably via a control valve (6a), the control valve (6a) being controlled in particular via a temperature-control device (TC).

The present invention is explained in more detail with reference to the subsequent FIGURE without however restricting the FIGURE to the specially represented embodiment.

The polymerisation of caprolactam to form polyamide 6 (also in the case of polymerisation of polyamide 6 with copolymers) is effected in a 1- or multistep process. The last process step is the cooling of the polyamide melt in order to raise the relative viscosity. For reasons of energy savings, the energy which is withdrawn from the polymer melt in the last reactor is used in order to preheat the raw material of the polymerisation. In this way, this energy is completely recovered.

Generally, the melt cooling of the polyamide is implemented by means of a heat transfer oil. This is controlled, as a function of the desired melt temperature in the outlet of the polymerisation reactor, to a constant temperature in the inflow to the melt cooler. The heat transfer oil is conducted, in the outflow of the melt cooler, to a part of the plant where the heat is used (alternatively to an air cooler) in order to heat another medium. Thereafter, the heat transfer oil which has a temperature below the temperature required for the melt cooling can be brought again to the required temperature by mixing with hot primary heat transfer oil. The temperature of the heat transfer oil is generally between 260° C. in the outlet of the melt cooler and 230° C. in the inflow of the melt cooler.

The heat from the heat transfer oil is generally used via a separate heat exchanger in order to heat the raw material, caprolactam, or the mixture of various raw materials (caprolactam+water+additives+extracts [optional]). Heating of caprolactam with heat transfer oil in a separate heat exchanger is problematic. The use of a tubular heat exchanger is not be recommended since individual pipes become blocked due to polymerisation of the caprolactam and, after a fairly long operating time, only a few heat exchanger pipes are still passable. Frequently, the required heat exchanger performance is no longer achieved. Similar problems occur in the use of plate heat exchangers and other standard forms of heat exchangers. In practice, the form of the double pipe heat exchanger has proved its worth, the caprolactam flowing in the inner pipe and the heat transfer pipe in the jacket pipe being guided in counterflow.

An alternative to using heat in a separate heat exchanger which has already been used many times is heating the heating jacket of a mixing container connected in front of the polymerisation. In this container, the raw materials of the polyamide are mixed and heated. The operating temperature in this mixing container is below the heat transfer oil temperature after the melt cooler. Thus the heat can be released into this container.

This solution is adequate for polymerisation plants with a small capacity but causes problems in plant sizes above 100 t/day since the heat transfer surface of the heating jacket is not adequate for dissipating the complete quantity of heat.

In FIG. 1, a polymerisation device according to the invention is represented, which comprises a polymerisation reactor 1, a mixing container 3 and also a pipeline 2 connecting the polymerisation reactor 1 and the mixing container 3. The mixing container has an inlet 3a with which monomeric material, for example ϵ-caprolactam, can be fed into the mixing container 3. In addition, via a further inflow 3a', further material, for example water, catalysts, additives or extracts can be fed into the mixing container. The mixing container can comprise for example mechanical devices for thorough mixing or mingling of the fed materials, for example agitation devices etc. The mixture produced in the mixing container 3 can be fed via the outlet 3b of the mixing container 3 into a pipeline 2 and be fed there into the polymerisation reactor 1. The polymerisation reactor 1 can have a one-step or multistep, for example two-step, configuration. In the case of a two-step configuration, the polymerisation reactor 1 can thereby comprise for example a pre-polymerisation step and also a post-condensation step. In the polymerisation reactor, the mixture supplied from the mixing container 3 is polymerised. The mixture is supplied to the polymerisation reactor 1 via the inflow 1a. The finished product, i.e. the melt of a thermoplastic polymer, for example a polyamide 6 melt, is removed from the polymerisation reactor 1 via the outlet 1b. It is now essential for the present invention that both the polymerisation reactor 1, the pipeline 2 and the mixing container 3 have heat exchanger elements 1c, 2c or 3c. The heat exchanger element 1c of the polymerisation reactor 1 can thereby be configured for example as tubular heat exchanger which is configured in particular in the outlet region of the polymerisation reactor, i.e. in the vicinity of the outlet 16b. Such a region of the polymerisation reactor 1 can be termed polymer cooling zone. The heat exchanger element 2c of the pipeline 2 is configured in particular by a double-walled construction of the pipe 2, the actual pipeline 2 with which the mixture from the mixing container 3 can be guided into the polymerisation reactor 1 is thereby the inner pipeline. The heat exchanger element 2c hence forms a covering of the pipeline 2. The heat exchanger element 3c of the mixing container is in particular configured as covering or double wall of the mixing container 3. All the heat exchanger elements 1c, 2c and 3c are thereby in fluidic communication and can be flowed through in succession, i.e. successively, by a heat exchanger fluid. Preferably, the heat exchanger fluid is thereby guided counter to the flow direction of the product materials, i.e. from the heat exchanger element 1c of the polymerisation reactor 1 via the heat exchanger element 2c of the pipeline 2 to the heat exchanger element 3c of the mixing container 3. With this device, thermal energy can be withdrawn from the finished polymer melt before discharge out of the polymerisation reactor 1 and can be fed into the educt materials which are supplied via the pipeline 2 from the mixing container 3 to the polymerisation reactor 1.

Hence recovery of the thermal energy can be accomplished without a large outlay in apparatus.

According to the embodiment according to FIG. 1, the heat exchanger fluid is guided in circulation. For this purpose, a pipeline 31 is provided, with which the heat exchanger fluid, after passing through the heat exchanger element 3c of the mixing container 3, can be returned into the heat exchanger element 1c of the polymerisation reactor 1. A pump 5 is provided in the pipeline 31 for conveying the heat exchanger fluid.

A further possibility provides that precisely the pipeline 4 with which educt materials, for example ϵ-caprolactam, are supplied to the mixing container 3, is provided with a heat exchanger 4c. This heat exchanger element 4c can likewise be designed as a double-walled pipe construction of the pipeline 4, the educt materials in turn being guided in the inner pipeline and the heat exchanger fluid in the covering of this pipeline 4. The heat exchanger fluid in the heat exchanger element 4c of the pipeline 4 is likewise guided in counterflow to the monomers guided in the pipeline 4. The heat exchanger element 4c of the pipeline 4 is thereby connected after the heat exchanger element 3c of the mixing container 3.

The heat exchanger element 4c can be attached to the circulation 31 of the heat exchanger fluid. For this purpose, for example a 3-way valve 31a can be provided, with which distribution of the heat exchanger fluid flow to the circulation 31 or to the heat exchanger 4c of the pipeline 4 can be controlled. For returning the heat exchanger fluid from the heat exchanger element 4c of the pipeline 4 to the circulation 31, a further pipeline 431 can be provided. For control of the distribution of the heat exchanger fluid to the circulation 31 or of the heat exchanger element 4c by means of the 3-way valve 31a, a temperature sensor TC can likewise be introduced into the pipeline 431. Hence precise temperature control of the educt materials is already possible in the pipeline 4, by a predefined quantity of heat transfer fluid being fed into the pipeline 4 via the 3-way valve.

The pipeline 4, for its part, can be supplied via a further supply 8 which can likewise have a temperature-controllable covering. For this purpose, an inlet 8a and also a discharge 8b of a temperature-controlling fluid, for example hot water, is provided. The educt materials, for example ε-caprolactam, is fed via a supply 81 into the pipeline 8.

Furthermore, the circulation 31 can have an outflow 7 and also an inflow 6 for the heat exchanger fluid which is guided in circulation 31. The inflow 6 can be controlled for example via a controllable valve 6a. The heat transfer fluid supplied via the inflow 6 to the circulation 31 can be pre-temperature-controlled to a specific temperature. By means of one or more further temperature sensors TC, with which for example the temperature of the discharged thermoplastic polymer melt or of the heat transfer fluid into the circulation 31 can be determined before entry into the heat exchanger element 1c of the polymerisation reactor 1, in addition the valve 6a and hence the quantity or the temperature of the supplied heat transfer fluid can be controlled and hence the temperature, with which the heat exchanger fluid flows through the heat exchanger element 1c, can be adjusted.

The invention claimed is:

1. A polymerisation device, comprising
   a) a polymerisation reactor of a one- or multistep configuration,
   b) a mixing container connected in front of the polymerisation reactor, and
   c) a pipeline which connects an outlet of the mixing container to an inlet of the polymerisation reactor,
   wherein the polymerisation reactor, the mixing container and the pipeline respectively comprise a heat exchanger element, the heat exchanger element of the polymerisation reactor, the heat exchanger element of the pipeline and the heat exchanger element of the mixing container being able to be flowed through by a heat exchanger fluid and being connected in series, so that the heat exchanger elements are in fluidic communication and the heat exchanger fluid can flow through the heat exchanger element of the polymerization reactor, the heat exchanger element of the pipeline, and the heat exchanger element of the mixing container in succession.

2. The polymerisation device according to claim 1, wherein the heat exchanger element of the pipeline is produced by a double-walled pipe construction of the pipeline.

3. The polymerisation device according to claim 1, wherein the heat exchanger element of the mixing container is a jacket.

4. The polymerisation device according to claim 3, wherein the heat exchanger fluid is guided in a circulation, by the heat exchanger element of the mixing container being connected via a pipeline to the heat exchanger element of the polymerisation reactor.

5. The polymerisation device according to claim 4, wherein the mixing container has an inlet which is supplied by a pipeline, wherein the pipeline has a heat exchanger element.

6. The polymerisation device according to claim 5, wherein the heat exchanger element of the pipeline which supplies the inlet of the mixing container is produced by a double-walled pipe construction of the pipeline which supplies the inlet of the mixing container.

7. The polymerisation device according to claim 5, wherein the heat exchanger element of the pipeline which supplies the inlet of the mixing container is connected in series to the heat exchanger element of the mixing container.

8. The polymerisation device according to claim 5, wherein the heat exchanger element of the mixing container is connected via a three-way valve or two two-way valves to the pipeline which connects the heat exchanger element of the mixing container to the heat exchanger element of the polymerisation reactor and to the heat exchanger element of the pipeline which supplies the inlet of the mixing container.

9. The polymerisation device according to claim 8, wherein the heat exchanger element of the pipeline which supplies the inlet of the mixing container is connected via a pipeline to the pipeline which connects the heat exchanger element of the mixing container to the heat exchanger element of the polymerization reactor.

10. The polymerisation device according to claim 9, wherein the pipeline which connects the pipeline which supplies the inlet of the mixing container with the pipeline which connects the heat exchanger element of the mixing container to the heat exchanger element of the polymerization reactor comprises a temperature sensor which serves for controlling the three-way valve.

11. The polymerisation device according to claim 4, wherein the pipeline which connects the heat exchanger element of the mixing container to the heat exchanger element of the polymerization reactor comprises a pump for conveying the heat exchanger fluid.

12. The polymerisation device according to claim 4, wherein the pipeline which connects the heat exchanger element of the mixing container to the heat exchanger element of the polymerization reactor has an inflow and an outflow for the heat exchanger fluid.

13. The polymerisation device according to claim 12, wherein the pipeline which connects the heat exchanger element of the mixing container to the heat exchanger element of the polymerization reactor has a temperature sensor for determining the temperature of the heat exchanger fluid in the pipeline which connects the heat exchanger element of the mixing container to the heat exchanger element of the polymerization reactor.

14. The polymerisation device according to claim 12, wherein the inflow comprises a control valve, via which the quantity of heat transfer fluid supplied via the inflow into the pipeline which connects the heat exchanger element of the mixing container to the heat exchanger element of the polymerization reactor can be regulated.

15. The polymerisation device according to claim 14, wherein the control valve is regulated by a temperature sensor.

16. The polymerisation device according to claim 5, wherein the pipeline which supplies the inlet of the mixing container is supplied with educt materials via a temperature-controlled supply.

17. A method for the production of a thermoplastic polymer by polymerisation or polycondensation, with a polymerisation device according to claim 1, wherein
 a) material to be polymerised or to be polycondensed is fed into a mixing container and optionally mixed with further substances to be mixed in,
 b) the material or material mixture is supplied via the pipeline which connects the mixing container to the polymerisation reactor and is polymerised or polycondensed in the polymerisation reactor to form the thermoplastic polymer,
 c) the thermoplastic polymer is cooled via the heat exchanger element of the polymerisation reactor, the heat exchanger medium guided in the heat exchanger element being heated, and
 d) the thermoplastic polymer subsequently is discharged as melt out of the polymerisation reactor via an outlet, wherein
 the heat exchanger fluid heated in the heat exchanger element of the polymerisation reactor is guided through the heat exchanger element of the pipeline which connects the mixing container to the polymerisation reactor, and subsequently through the heat exchanger element of the mixing container, the material or material mixture guided or contained in the pipeline and in the mixing container is temperature-controlled.

18. The method according to claim 17, wherein the heat exchanger fluid in the heat exchanger element of the pipeline is guided in counterflow direction to the flow direction of the material or of the material mixture.

19. The method according to claim 17, wherein the heat exchanger fluid, after passing through the heat exchanger element of the mixing container,
 a) is fed into a pipeline and supplied to the heat exchanger element of the polymerisation reactor and subsequently is guided in circulation, or
 b) is fed into a heat exchanger element of a pipeline which supplies the inlet of the mixing container and is guided in counterflow direction to the direction of the material guided in the pipeline.

20. The method according to claim 19, wherein the feeding of the heat exchanger fluid into the pipeline which connects the heat exchanger element of mixing container to the heat exchanger element of the polymerisation reactor or into the heat exchanger element of the pipeline which supplies the inlet of the mixing container is effected via a three-way valve, and control of the volume distribution of the proportion of the heat exchanger fluid fed into the pipeline or into the heat exchanger element is effected with temperature control via a temperature sensor.

21. The method according to claim 17, wherein warm heat exchanger fluid is removed from the pipeline which connects the heat exchanger element of the mixing container to the heat exchanger element of the polymerisation reactor via an outlet and cooled heat exchanger fluid is supplied via a supply, the quantity of discharged or supplied heat exchanger fluid is controlled via a control valve, and the control valve is controlled via a temperature-control device.

22. The polymerisation device according to claim 4, wherein the polymerization reactor has a temperature sensor for determining the temperature of the content of the polymerisation reactor.

23. The polymerisation device according to claim 12, wherein the outflow comprises a control valve, via which the quantity of heat transfer fluid discharged via the outflow from the pipeline which connects the heat exchanger element of the mixing container to the heat exchanger element of the polymerization reactor can be regulated.

* * * * *